United States Patent [19]

Szlaga

[11] Patent Number: 4,953,583
[45] Date of Patent: Sep. 4, 1990

[54] TANK PRESSURE CONTROL VALVE

[75] Inventor: Emil Szlaga, Connersville, Ind.

[73] Assignee: Stant Inc., Connersville, Ind.

[21] Appl. No.: 328,451

[22] Filed: Mar. 24, 1989

[51] Int. Cl.$^5$ .................................. F16K 17/196
[52] U.S. Cl. ............................ 137/118; 137/493.9;
  137/587; 220/203
[58] Field of Search ............... 137/493.1, 493.9, 118,
  137/202, 587, 494; 220/203, 208, 85 VS, 85
  VR; 123/516, 519

[56] References Cited

U.S. PATENT DOCUMENTS

| | | | |
|---|---|---|---|
| 2,133,200 | 10/1938 | Kenneweg | 220/208 X |
| 2,399,326 | 4/1946 | Crot | 137/494 X |
| 2,860,656 | 11/1958 | Eshbaugh | |
| 3,062,246 | 11/1962 | Koehler | |
| 3,363,641 | 1/1968 | Mylander | |
| 3,606,908 | 9/1971 | Riester | |
| 3,744,516 | 7/1973 | Rowe | |
| 3,771,690 | 11/1973 | Hunter | |
| 3,907,153 | 9/1975 | Mutty | |
| 4,036,255 | 7/1977 | Wilson | |
| 4,191,208 | 4/1980 | Mylander | |
| 4,292,996 | 10/1981 | Pataki et al. | |
| 4,312,649 | 1/1982 | Fujii et al. | 220/85 VS X |
| 4,405,000 | 9/1983 | Fuller | |
| 4,416,108 | 11/1983 | Ghandhi | |
| 4,444,222 | 4/1984 | Yamagiwa | |
| 4,706,708 | 11/1987 | Fornuto et al. | |
| 4,714,171 | 12/1987 | Sasaki et al. | |
| 4,715,509 | 12/1987 | Ito et al. | |
| 4,760,858 | 8/1988 | Szlaga | 220/85 VS X |
| 4,790,349 | 12/1988 | Harris | |
| 4,796,593 | 1/1989 | Woodcock et al. | 123/516 X |

FOREIGN PATENT DOCUMENTS 2743490 4/1979 Fed. Rep. of Germany .
 528419 9/1976 U.S.S.R. ............................... 137/494

*Primary Examiner*—Stephen M. Hepperle
*Attorney, Agent, or Firm*—Barnes & Thornburg

[57] ABSTRACT

An apparatus is provided for controlling discharge of fuel vapors from a fuel tank during refueling. The apparatus includes a conduit for conducting fuel vapor between the fuel tank and a first destination such as a vapor treatment canister situated outside of the fuel tank, a valve operable between a flow-blocking position and a flow-delivery position for selectively blocking flow of fuel vapor through the conduit, and a spring for yieldably biasing the valve toward its flow-blocking position. A venting control chamber is situated in communication with the valve for receiving and using fuel vapor pressure from the fuel tank having a magnitude in excess of a predetermined threshold level to exert an opening force on the valve in opposition to the spring so that the valve is moved to its flow-delivery position. Such movement of the valve permits discharge of pressurized fuel vapor in the tank to said first destination through the conduit. In addition to the foregoing primary venting system, the apparatus is made stageable by including an optional auxiliary system for venting the fuel tank to a second destination.

30 Claims, 4 Drawing Sheets

TANK PRESSURE CONTROL VALVE

BACKGROUND AND SUMMARY OF THE INVENTION

The present invention relates to pressure control valves for selectively discharging fuel vapor pressure from a fuel tank during refueling and introducing air into the fuel tank in response to development of vacuum conditions therein. More particularly, the present invention relates to a stageable tank pressure control valve having a primary stage system for venting the fuel tank to a first destination and an optional auxiliary stage system for venting the fuel tank to a second destination.

New fuel vapors are generated during refueling due to splash and agitation of the dispensed fuel, as well as from potential temperature differences between the fuel tank and the dispensed fuel. In addition, as the liquid fuel dispensed at the pump fills the vehicle fuel tank, fuel vapors that are present in the tank and generated during refueling are displaced by liquid fuel. These displaced fuel vapors are moved out of the fuel tank vapor space by the displacing action of the liquid fuel. In many conventional vehicle fuel systems, these displaced vapors are released directly into the atmosphere via the fuel tank filler neck and are a contributing factor to air pollution.

Although some systems are available to capture and store fuel vapors that are displaced and generated in a fuel tank during a typical vehicle refueling operation, many of these systems are complex to assemble, costly to manufacture, and ineffective and/or unreliable in use. Another shortcoming of typical conventional valves is that the discharge capacity of the valve is lower than that capacity necessary to vent the fuel tank properly during refueling because of small size requirements imposed on these pressure valves. Such small size requirements are made necessary by the shortage of available space in the vicinity of the vehicle fuel tank. Inadequate discharge capacity can result in unwanted discharge of fuel vapor to the atmosphere if fuel vapor exits the tank through the filler neck or other outlet because the conventional tank pressure control valve is unable to regulate the discharge of pressurized fuel vapor to a canister or other suitable fuel vapor treatment site properly and in a timely manner.

One object of the present invention is to provide a tank pressure control valve of small size and economical construction that nevertheless is configured to discharge a substantial volume and mass of pressurized fuel vapor from a fuel tank using a minimum of moving parts during development of high vapor pressure in the tank such as occurs during refueling or the like.

Another object of the present invention is to provide a tank pressure control valve having at least two tank venting stages so that one venting path is established between the fuel tank and a first destination (e.g., a vapor treatment site) upon development of a first pressure magnitude in the tank, and another venting path is established between the fuel tank and a second destination (e.g., an auxiliary fuel vapor treatment site) upon further development of a greater second pressure magnitude in the tank.

Yet another object of the present invention is to provide a tank pressure-relief control valve that is configured to close automatically following conclusion of a vehicle refueling activity, yet is also configured to function as a vacuum-relief valve in response to development of subatmospheric pressure in the fuel tank.

In accordance with the present invention, an apparatus is provided for controlling discharge of fuel vapors from a fuel tank during refueling. The apparatus includes means for conducting fuel vapor between the fuel tank and a fuel vapor treatment site situated outside of the fuel tank, means for selectively blocking flow of fuel vapor through the conducting means, and biasing means. The blocking means is operable between a flow-blocking position and a flow-delivery position. The biasing means acts to yieldably bias the blocking means toward its flow-blocking position.

Means is further provided for receiving and using fuel vapor pressure from the fuel tank having a magnitude in excess of a predetermined threshold level to exert an opening force on the blocking means in opposition to the biasinq means. The usinq means defines a venting control chamber in communication with the blocking means. In operation, the blocking means is moved to its flow-delivery position because of containment of fuel vapor pressure in the venting control chamber, thereby permitting discharge of pressurized fuel vapor in the tank to said fuel vapor treatment site through the conducting means.

In preferred embodiments, the venting control chamber is situated outside of the fuel tank and the blocking means extends through the conducting means into the fuel tank and includes means for communicating fuel vapor from the fuel tank to the venting control chamber. The conducting means includes a partition formed to include a venting aperture interconnecting the fuel tank and fuel vapor treatment site in fluid communication. The blocking means further includes an elongated stem having a valve member affixed at one end and a support member affixed at the other end. The valve member is formed to include a central aperture communicating with the fuel tank and the support member is formed to include a central aperture.

The using means includes first and second walls sealably coupled together to define the venting control chamber. Also, the first and second walls are movable relative to one another to permit expansion and contraction of the volume of the venting control chamber. In a preferred embodiment, the support member forms a portion of the second wall.

The biasing means is situated to act between the partition and the support member normally to urge the valve member against the partition closing the venting aperture. The stem is hollow to provide a pressure transmission passage interconnecting the central apertures of the valve member and the support member and terminating in the venting control chamber to define the communicating means.

Also in preferred embodiments, systems are provided for moving the valve member to its closed position at the conclusion of a refueling activity. Means is provided in the fuel tank for blocking introduction of pressurized fuel vapor in the fuel tank into the communicating means to prevent communication of pressurized fuel vapor to the venting control chamber in response to accumulation of fuel in the fuel tank in excess of a predetermined volume. This level-sensing means acts to shut off supply of pressurized fuel vapor to the venting control chamber through the communicating means. Means is also provided for bleeding pressurized fuel vapor from the venting control chamber at a predetermined rate to permit the biasing means to move the support member and the second wall relative to the first wall, thereby contracting the volume of the venting control chamber and urging the venting valve member toward its flow-blocking position.

A stageable tank pressure control valve further includes means for communicating fuel vapor from the conducting means to at least one of the atmosphere and another fuel vapor treatment site, valve means for selectively blocking flow of fuel vapor through the communicating means, and auxiliary biasing means for yieldably biasing the valve means toward its flow-blocking position. The valve means is operable between a flow-blocking position and flow-delivery positions. In addition, control means communicating with the venting control chamber is provided for using fuel vapor pressure in the fuel tank having a magnitude in excess of a greater second predetermined threshold level to exert an opening force on the valve means so that the valve means is moved in opposition to the auxiliary biasing means to its flow-delivery position. Such movement of the valve member permits discharge of pressurized fuel vapor in the tank to another destination such as a fuel vapor treatment site through the conducting means and the communicating means.

One feature of the present invention is the provision of means for using fuel vapor pressure from the fuel tank in a venting control chamber to control the actuation of flow-blocking means to regulate the flow of fuel vapor into and out of the fuel tank. The blocking means is acted upon by a force generated by fuel vapor pressure in the venting control chamber to move the blocking means from its normal flow-blocking position to its flow-delivery position. Thus, by controlling the surface area of that portion of the blocking means exposed to pressure in the venting control chamber, it is possible to control the actuation of the blocking means with great precision.

In addition, the magnitude of the actuation force applied to the blocking means by fuel vapor pressure in the venting control chamber is not affected by the size of the venting aperture closable by the blocking means. Thus, the size of the venting aperture can be enlarged to increase the discharge capacity of the venting assembly without sacrificing reliability or increasing the overall size of the assembly.

Another feature of the present invention is the provision of a two-stage tank pressure control valve having control means communicating with the venting control chamber for using fuel vapor pressure to open an auxiliary valve. preferably, the control valve is set up to open the auxiliary valve whenever the pressure in the venting control chamber rises above the actuation pressure of the blocking means to a second greater pressure. Advantageously, the auxiliary valve can be used to discharge excess fuel vapor to a second destination (e.g., another fuel vapor treatment site) to avoid overloading the capacity of the canister connectable to the fuel tank by actuation of the blocking means.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
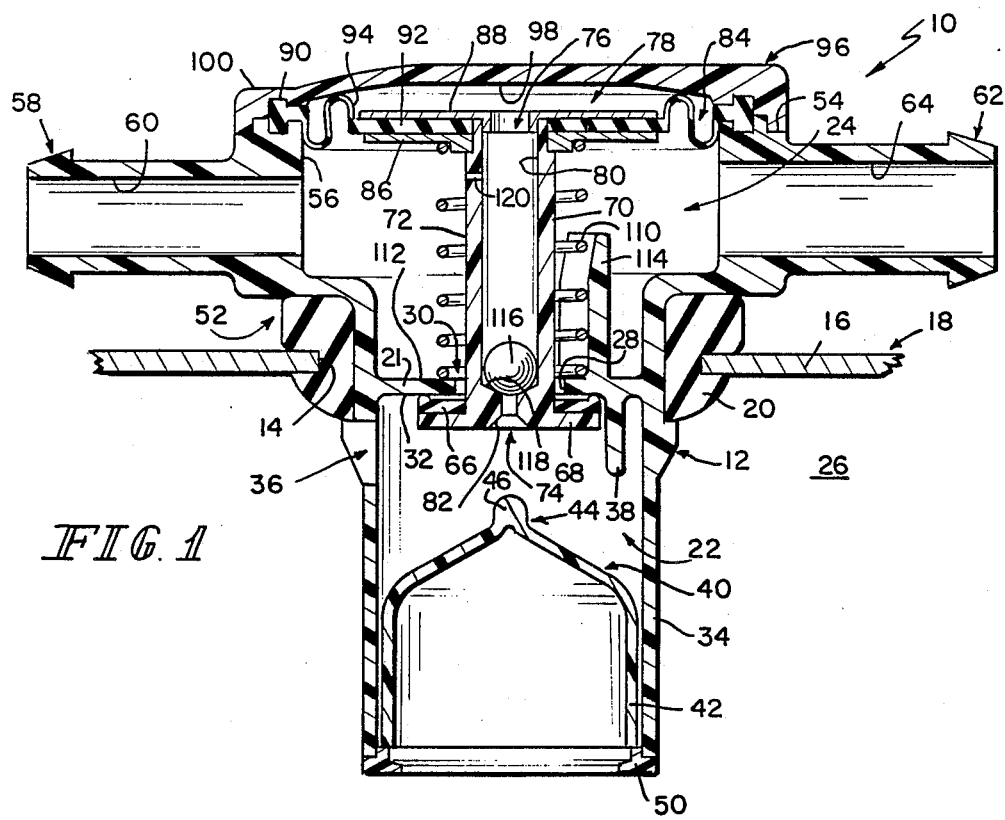
FIG. 1 is a sectional view of an embodiment of a single-stage valve assembly in accordance with the present invention showing blocking means of the assembly in its flow-blocking position.

A first embodiment of the invention is illustrated in FIGS. 1-4. A valve assembly 10 is provided for use with a conventional fuel system (not shown) having a fuel tank and at least one fuel vapor storage canister. A hollow vent housing 12 is mounted in the outlet 14 formed in the top wall 16 of a fuel tank 18 as shown in FIG. 1. Gasket 20 seals the joint between top wall 16 and the portion of housing 12 bordering outlet 14 to prevent the escape of fuel vapor therethrough.

A partition 21 extends into the interior of the housing 12 to divide the housing 12 into inner and outer chambers 22 and 24. Housing 12 is mounted in outlet 14 to position the inner chamber 22 substantially within the vapor space 26 of the fuel tank 18 and to position the outer chamber 24 on the other side of the top wall 16 of tank 18. Partition 21 includes an annular radially inwardly facing surface 28 defining a venting aperture 30 and an axially inwardly facing surface 32 providing a valve seat in the inner chamber 22. Venting aperture 30 interconnects the inner and outer chambers 22 and 24 in fluid communication and provides a first fuel vapor flow port for conducting fuel vapor between chambers 22 and 24.

Inner chamber 22 is defined by a lower side wall 34 of housing 12. Side wall 34 is formed to include aperture means 36 near partition 21 for interconnecting inner chamber 22 and vapor space 26 in fluid communication. Valve guide 38 is attached to surface 32 of partition 21 and extends in an axially inward direction as shown in FIG. 1 in radially outwardly spaced direction relative to venting aperture 30.

Figure 3:
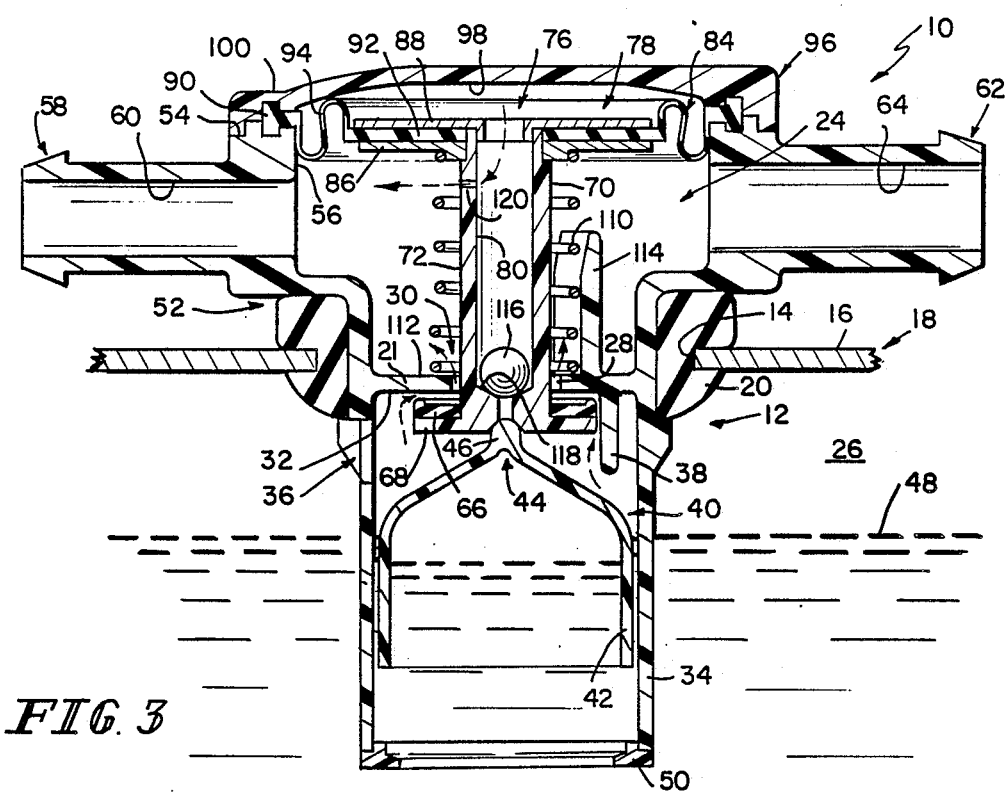
FIG. 3 is a view of the valve assembly shown in FIG. 1 showing bleeding of pressure in the venting control chamber upon cessation of the supply of pressurized fuel vapor from the fuel tank to the venting control chamber.

Hollow float member 40 is positioned in inner chamber 22 as shown in FIG. 1. Float member 40 is cup-shaped and includes a side wall 42 contoured to terminate at a valve stem 44 having a distal spherical end 46. Float member 40 is hollowed or otherwise configured to be supported buoyantly in liquid fuel 48 in the fuel tank 18 upon accumulation of a sufficient volume of fuel as illustrated in FIG. 3. An end cap 50 is ring-shaped and coupled to the axially innermost end of side wall 42 to retain float member 40 within inner chamber 22.

Outer chamber 24 is defined in part by upper housing portion 52 of housing 12 which extends in an axially outward direction from partition 21 and is formed to include an annular top wall 54 having an annular radially inwardly facing edge 56 which defines a top opening. Upper housing portion 52 also includes a first discharge outlet 58 formed to include a first passageway 60 for conducting fuel vapor from the outer chamber 24 to a first fuel vapor treatment site (not shown). In the illustrated embodiment, upper housing portion 52 further includes a second discharge outlet 62 formed to include a second passageway 64 for conducting fuel vapor from the outer chamber 24 to a second destination such as a second fuel vapor treatment site.

Venting valve member 66 is formed of a resilient sealing material and positioned in inner chamber 22 for movement toward and away from engagement with valve seat 32. Venting valve member 66 is ring-shaped and mounted on the top surface of annular valve support pad 68. A cylindrically shaped hollow stem 70 extends through venting aperture 30 and has an axially inner end connected to valve support pad 68. The diameter of stem 70 is selected so that the exterior surface 72 of stem 70 lies in spaced-apart relation to annular radially inwardly facing surface 28 to define an annular venting space therebetween through which fuel vapor can be conducted between the inner and outer chambers 22 and 24 upon movement of venting valve member 66 away from valve seat 32 to a flow-delivering position. As shown in FIG. 1, valve member 66 is ring-shaped so that a radially inwardly facing edge abuts the exterior surface 72 of stem 70 adjacent the connection between the stem 70 and the valve support pad 68.

Stem 70 is configured and positioned to assist in actuating valve member 66 and thus will henceforth be referred to as the actuator stem 70. In particular, actuator stem 70 is hollowed to provide an inlet 74 at its axially inner end for admitting pressurized fuel vapor from the vapor space 26, an outlet 76 at its axially outer end for discharging fuel vapor into a venting control chamber 78, and a pressure transmission passage 80 extending therebetween. Inlet 74 provides a second fuel vapor flow port for conducting fuel vapor between chambers 22 and 24.

Actuator stem 78 is also formed to include an axially downwardly facing, generally conical valve seat 82 in concentric registry with inlet 74. The distal spherical end 46 of valve stem 44 is configured to seal against the conical valve seat 82 upon flotation of float member 40 to its raised floating position illustrated in FIG. 3.

A barrier assembly is positioned in the outer chamber 24 near the top opening 56 of the upper housing portion 52 to interconnect the annular top wall 54 to the axially outer end of the actuator stem 78 to define a sealed boundary wall between the outer chamber 24 and the venting control chamber 78. The barrier member assembly includes a flexible diaphragm 84, an annular support 86, and an annular actuation pad 88. Diaphragm 84 includes a mounting rim 90 contacting top wall 52, an actuation member 92, and an annular sealing web 94 interconnecting mounting rim 90 and actuation member 92. Actuation member 92 is sandwiched between the annular support member 86 and annular actuation pad 88 to form a ring-like assembly affixed to the axially outer end of actuator stem 70 as shown in FIG. 1. Each of support member 86, actuation pad 88, and actuation member 92 are formed to include a central aperture which is aligned in concentric registry with the outlet 76 of hollow actuator stem 70 as seen in FIG. 1. Thus, pressurized fuel vapor in the vapor space 26 of fuel tank 18 is communicable to venting control chamber 78 via pressure transmission passage 80.

A control chamber cover 96 is affixed to top wall 52 so that its interior wall 98 is presented toward the radially inwardly situated actuation pad 92 and the radially outwardly situated sealing web 94. The outer rim 100 of cover 96 urges mounting rim 90 against top wall 52 to establish a circumferentially extending vapor seal which acts to prevent pressurized fuel vapor in venting control chamber 78 from seeping into the outer chamber 24. Thus, interior wall 98 of cover 96 provides a first boundary wall and the axially outwardly facing surface of sealing web 94, actuation member 92, and actuation pad 99 provide a second boundary wall, which first and second boundary walls cooperate to define the venting control chamber 78. The volume of chamber 78 is expandable and contractible because the flexible, resilient character of sealing web 94 permits movement of the actuation member 92, actuation pad 92, support member 86, and actuator stem 70 relative to the interior wall 98 of the control chamber cover 96.

A coiled compression spring 110 is positioned in outer chamber 24 and acts between the axially inwardly facing surface of annular support member 86 and an axially outwardly facing surface 112 of partition 21. Under normal low tank pressure conditions, spring 110 urges venting valve member 66 against valve seat 32 to close the venting space in venting aperture 30 between annular radially inwardly facing surface 28 and exterior surface 72 of actuator stem 70. Simultaneously, spring 110 urges support member 86 and the rest of the barrier assembly toward the control chamber cover 96 to contact the volume of the venting control chamber 78 as shown in FIG. 1. Further, an upstanding spring guard 114 is affixed to surface 112 and extends in an axially outward direction as shown in FIG. 1 to improve assembly and operation of spring 110.

Ball valve 116 is loosely positioned in pressure transmission passage 80 as shown in FIG. 1. Normally, ball valve 116 rests against an axially upwardly facing, generally conical valve seat 118 in concentric registry with inlet 74 to block flow of fuel vapor pressure into pressure transmission passage 80. However, the mass and the size of the ball valve 116 are carefully selected so that pressure in inlet 74 will act to lift ball valve 116 away from seat 118 whenever the head pressure in the vapor space 26 is in excess of a predetermined threshold level such as a head pressure of about four to ten inches of water. Thus, ball valve 116 acts to limit entry of pressurized fuel vapor into the venting control chamber 78 until pressure in fuel tank 18 rises to at least a minimum level.

Means is also provided for controllably discharging discharging fuel vapor from the venting control chamber 78 to reduce the magnitude of pressure therein under certain conditions. In the illustrated embodiment, the actuator stem 70 is formed to include bleed aperture 120 which functions to provide means for "bleeding" pressure from the venting control chamber 78 to the outer chamber 24 at a predetermined rate, causing the magnitude of pressure in the venting control chamber 78 progressively to decrease upon engagement of the distal spherical end 46 of valve stem 44 against conical valve seat 82. Importantly, the size of bleed aperture 120 is not large enough to affect normal expansion of the venting control chamber 78 substantially during introduction of pressurized fuel vapor into chamber 78 through pressure transmission passage 80.

Figure 2:
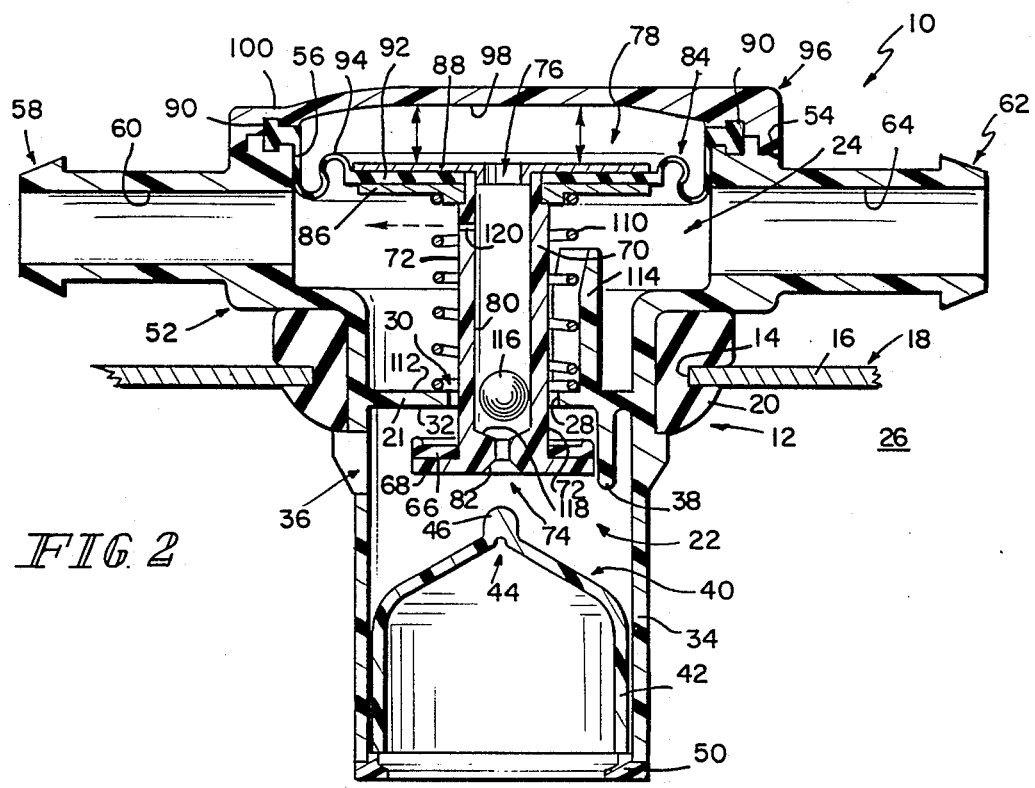
FIG. 2 is a view of the valve assembly shown in FIG. 1 showing the blocking means in its flow-delivery position.
Figure 4:
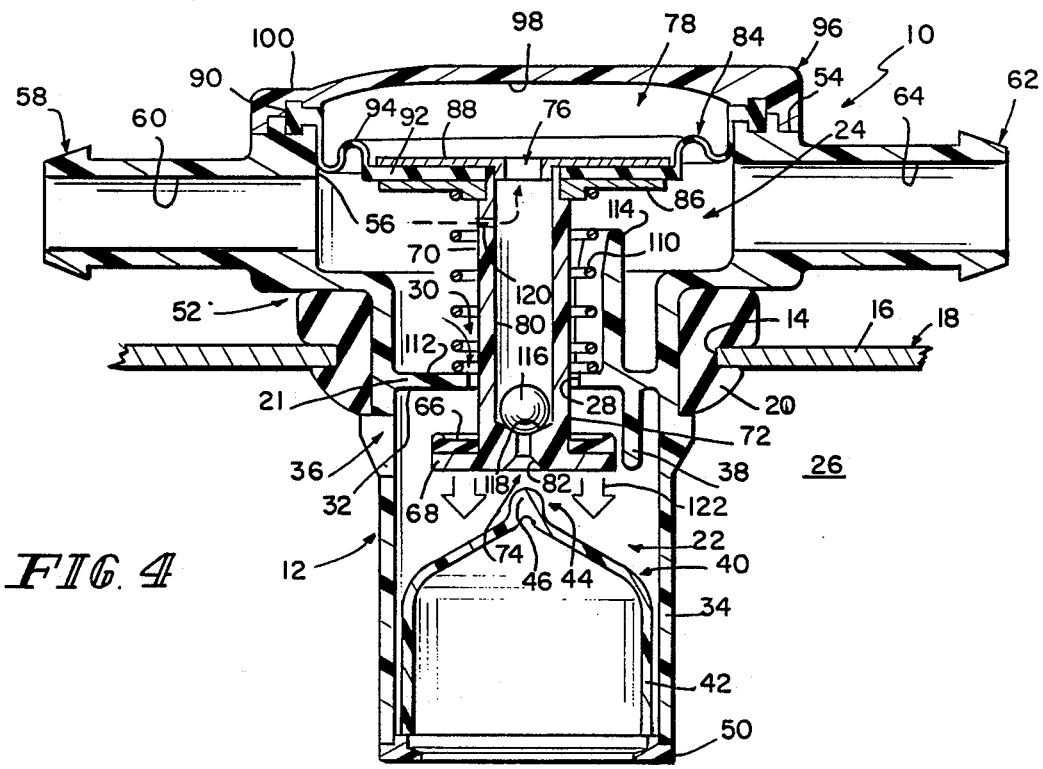
FIG. 4 is a view of the valve assembly shown in FIG. 1 showing the position of the blocking means in response to development of subatmospheric pressure in the fuel tank.

A sequence of operation of valve assembly 10 is illustrated in FIGS. 1-3 and an alternative function of valve 66 is illustrated in FIG. 4. Referring to FIG. 1, spring 110 normally acts to urge valve 66 to its flow-blocking position against valve seat 32 so that no fuel vapor is conducted from vapor space 26 to either of the first and second fluid-conducting passageways 60 and 64 through the inner and outer chambers 22 and 24. Thus, fuel vapor from the tank 18 is not vented through valve assembly 10 to one of the vapor storage canisters (not shown) coupled to passageways 60 and 64. At the same time, ball valve 116 closes pressure transmission passageway 80 to prevent premature expansion of the volume in venting control chamber 78 and actuation of venting control valve 66.

Actuation of the venting control valve is illustrated in FIG. 2. Ball valve 116 is moved away from conical valve seat 118 as soon as pressure in the inlet 74 rises sufficiently to apply a lifting force to ball valve 116. Then, pressure generated by fuel vapor in the tank 18 during, for example, refueling of tank 18, will be transmitted to the venting control chamber 78. Once the magnitude of this pressure rises above a predetermined threshold level, it will act to apply an "actuation force" to at least actuation pad 88 sufficient to cause support member 86 to move against the opposing force provided by spring 110 and move the actuator stem 70 in an axially inward direction through venting aperture 30. This causes the venting valve member 66 to move away from valve seat 32 to a flow-delivery position, allowing pressurized fuel vapor in the tank 18 to vent on a fuel vapor storage canister (not shown) through valve assembly 10.

One notable advantage of the present invention is that much better control over the actuation of valve 66 can be achieved easily by enlarging the "surface area" of the actuation pad 88 exposed to pressure in the venting control chamber 78. The magnitude of "actuation force" described above is a function of the pressure in venting control chamber 78 which acts on the above-noted "surface area." It has been observed that one problem frequently encountered in high-volume manufacturing is production of a multiplicity of valves wherein each actuable valve is consistently actuated in use in response to the exact same set of inputs. Advantageously, valve actuation "sensitivity" problems of the type described can be minimized by using pressure in a control chamber separate from the fuel tank and also by enlarging the surface area of the valve portion exposed to pressure in the separate control chamber. In addition, this type of valve actuation system is easily incorporated into a compact structure to save valuable space and at low cost.

Movement of valve 66 toward its flow-blocking position is illustrated in FIG. 3. Float valve 40 rises in inner chamber 22 to close inlet 74 in actuator stem 70 in response to accumulation of liquid fuel in tank 18 in excess of a predetermined volume. Such closure is necessary to prevent discharge of liquid fuel to the canisters (not shown) and also to raise the pressure within tank 18 near the end of a refueling activity sufficiently to actuate the shut-off assembly in a fuel-dispensing nozzle (not shown) communicating with the tank 18. Thus, valve 40 acts to provide means for selectively disabling communication of pressure from vapor space 26 to venting control chamber 78 through pressure transmission passage 80.

Another notable advantage of the present invention is the increased fuel vapor discharge capacity of valve assembly 10 that results form the enlargement of venting aperture 30 as compared to conventional structures. As is evident in FIG. 3, venting aperture 30 plays no part in either actuating or deactuating valve 66. Instead, that function is taken care of, in part, by venting control chamber 78 and pressure transmission passageway 80. Thus, venting aperture 30 can be enlarged without diminishing the closability of valve 66 in any way. Advantageously, discharge capacity of valve assembly 10 can be measurably improved by enlargement of venting aperture 30.

Continuing to refer to FIG. 3, it will be seen that pressure is bled from venting control chamber 78 to outer chamber 24 through bleed aperture 120 so that the volume of chamber 78 is contracted as spring 110 urges support member 86 toward chamber cover 96. Such movement causes actuator stem 70 to move in an axially outward direction through venting aperture 30, thereby moving valve 66 toward its flow-blocking position (shown in FIG. 1).

A vacuum-relief function of valve assembly 10 is illustrated in FIG. 4. Valve support pad 68 is moved downwardly in the direction of double arrows 122 in response to suction caused by subatmospheric pressure in the fuel tank 18 to draw ambient air into fuel tank 18 through the passageways 60, 64, outer chamber 24, venting aperture 30, and inner chamber 22. Ball valve 116 will occupy its closed position shown in FIG. 4 during this vacuum-relief activity so that air drawn into venting control chamber 78 via bleed aperture 120 is not introduced into fuel tank 18 via pressure transmission passage 80 and inlet 74 to disrupt the vacuum-relief activity.

Figure 5:
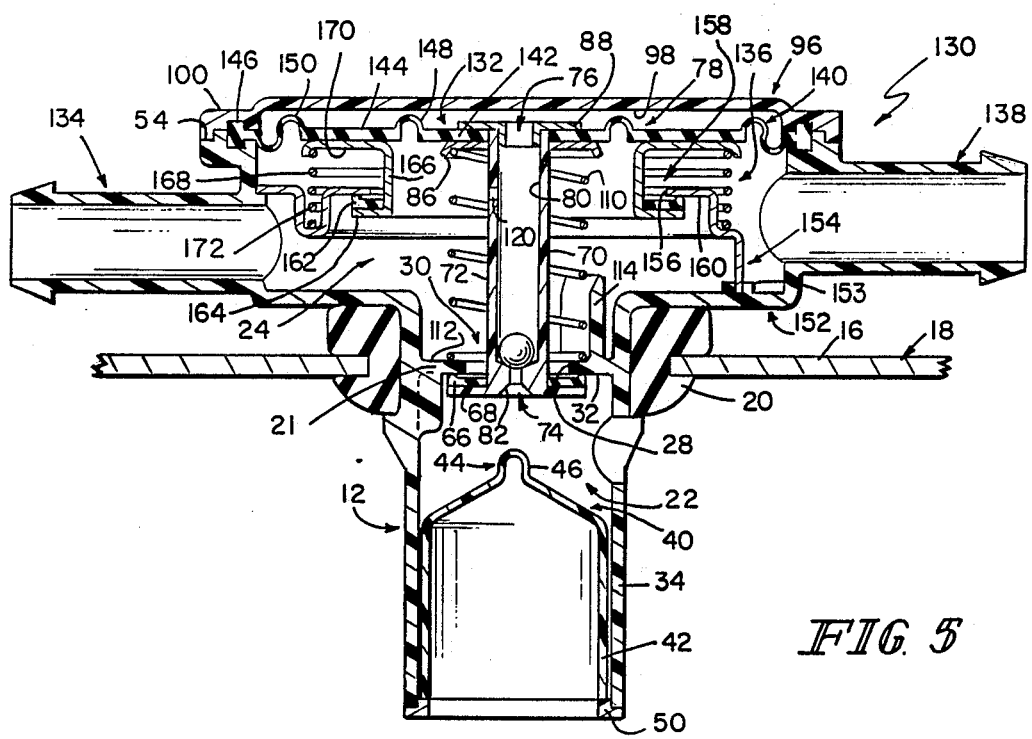
FIG. 5 is a sectional view of an embodiment of a two-stage valve assembly in accordance with the present invention showing each of the first- and second-stage valves in its flow-blocking position.

In another embodiment of the invention illustrated in FIGS. 5-8, those elements referenced by numbers identical to those in FIGS. 1-4 perform the same or similar function. Referring to FIG. 5, a two-stage tank pressure control valve assembly 130 includes a first-stage or primary valve assembly 132 that functions in the same manner as valve assembly 10 to vent fuel vapor through a first discharge outlet 134 and, in addition, a second-stage or auxiliary valve assembly 136 that functions also using pressure in venting control chamber 78 to vent fuel vapor through a second discharge outlet 138. Advantageously, second-stage venting valve assembly 136 permits pressurized fuel vapor to be vented through second discharge outlet 138 selectively either to a second fuel vapor treatment site (not shown) or the atmosphere while a first-stage venting valve is already venting some pressurized fuel vapor through first discharge outlet 132 to a first fuel vapor treatment site (not shown).

In this embodiment, a flexible, annular diaphragm 140 interconnects top surface 54 and the axially outer end of actuator stem 70. Diaphragm 140 includes a radially innermost annular first-stage actuation member 142, a radially outer annular second-stage actuation member 144, an annular mounting rim 146, a first sealing web 148 sealingly interconnecting the first- and second-stage actuation members 142, 144, and a second sealing web 150 sealingly interconnecting the second-stage actuation member 144 and the mounting rim 146. It will be understood that the first-stage actuation member 142 functions in the same manner as actuation member 92 in the embodiment of FIGS. 1-4.

The valve assembly 130 includes an upper housing portion 152 that is modified slightly in comparison to upper housing portion 52 to accommodate the second-stage valve assembly 136. In particular, upper housing portion 152 is configured as at 153 to retain venting insert 154 therein. Venting insert 154 includes a radially inwardly facing surface 156 defining an auxiliary venting aperture 158 and an axially inwardly facing surface 160 providing a valve seat.

An annular auxiliary venting valve 162 is mounted on an annular valve support pad 164 affixed to a valve support collar 166 which depends from the underside of the second-stage actuation member 144 as shown in FIG. 5. Auxiliary venting valve 162 is movable between a flow-blocking position against valve seat 160 and a flow-delivery position away from valve seat 160. A coiled compression spring 168 acts between a spring support plate 170 of the valve support collar 166 and a spring-receiving groove 172 formed in the venting insert 154 normally to bias the auxiliary venting valve 162 to its flow-blocking position as illustrated in FIG. 5.

A sequence of operation of two-stage tank pressure control valve assembly 130 is illustrated in FIGS. 5-8. The configuration of the valve assembly 130 during normal conditions of low fuel tank pressure comparable to the conditions shown in FIG. 1 is illustrated in FIG. 5. In this case, valve 66 is closed so that no fuel vapor can flow through venting aperture 30 to either the first discharge outlet 134 or act to open the auxiliary valve 162 to permit fuel vapor to flow through the auxiliary ventinq aperture 158 to the second discharge outlet 138.

Figure 6:
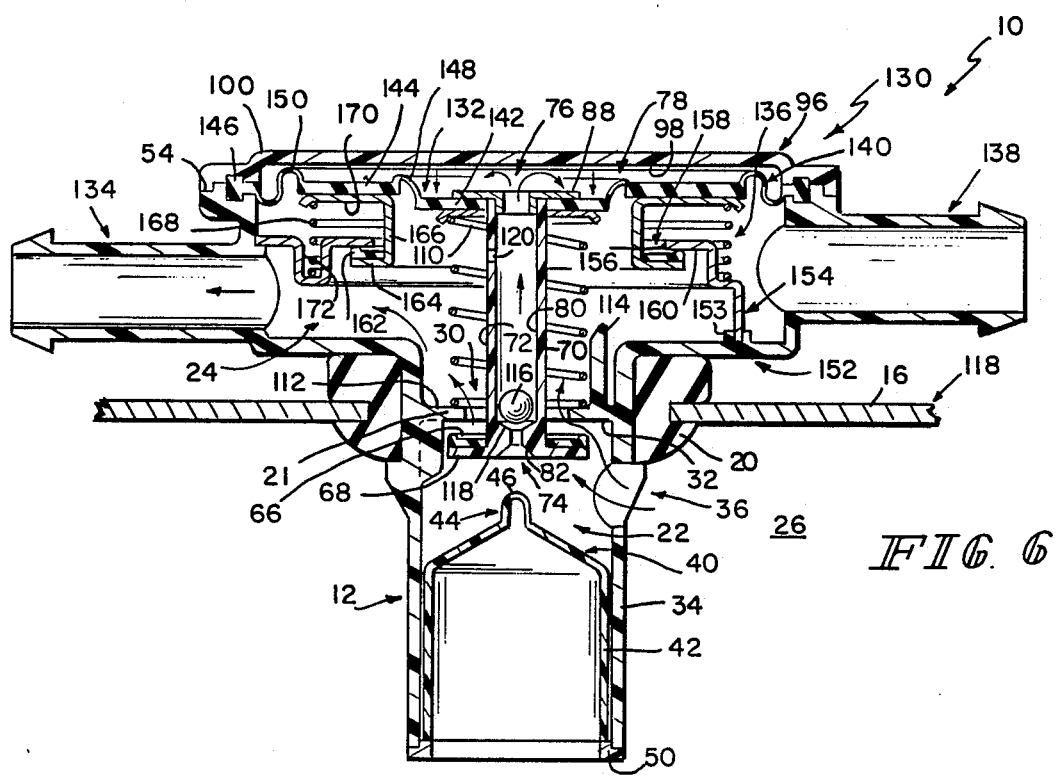
FIG. 6 is a view of the valve assembly shown in FIG. 5 showing the first-stage valve in its flow-delivery position to vent tank pressure to a first destination and the second-stage valve in its flow-blocking position.

Primary venting valve 66 is shown in its open position in FIG. 6. At this stage, the magnitude of the pressure in the venting control chamber 78 is great enough to exert a force sufficient to move first-stage actuation member 142 in an axially inward direction against an opposing force provided by coil spring 110 and cause actuator stem 70 to move valve 66 to its flow-delivery position, thereby venting tank 18 through the first discharge outlet. However, the pressure magnitude is not great enough to exert a force sufficient to move second-stage actuation member 144 in an axially inward direction against an opposing force provided by coil spring 168. Thus, auxiliary valve 158 remains in its closed position to block flow of fuel vapor through the second discharge outlet 138.

Figure 7:
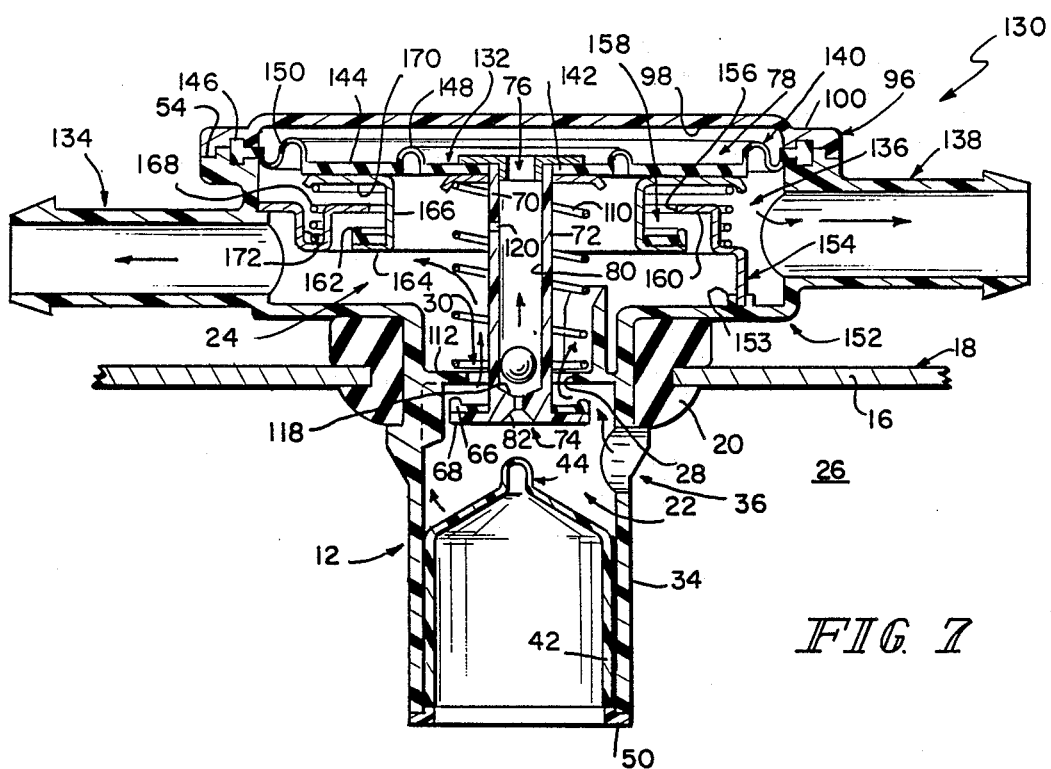
FIG. 7 is a view of the valve assembly shown in FIG. 5 showing both first- and second-stage valves in their flow-delivering positions to vent tank pressure to two separate destinations.
Figure 8:
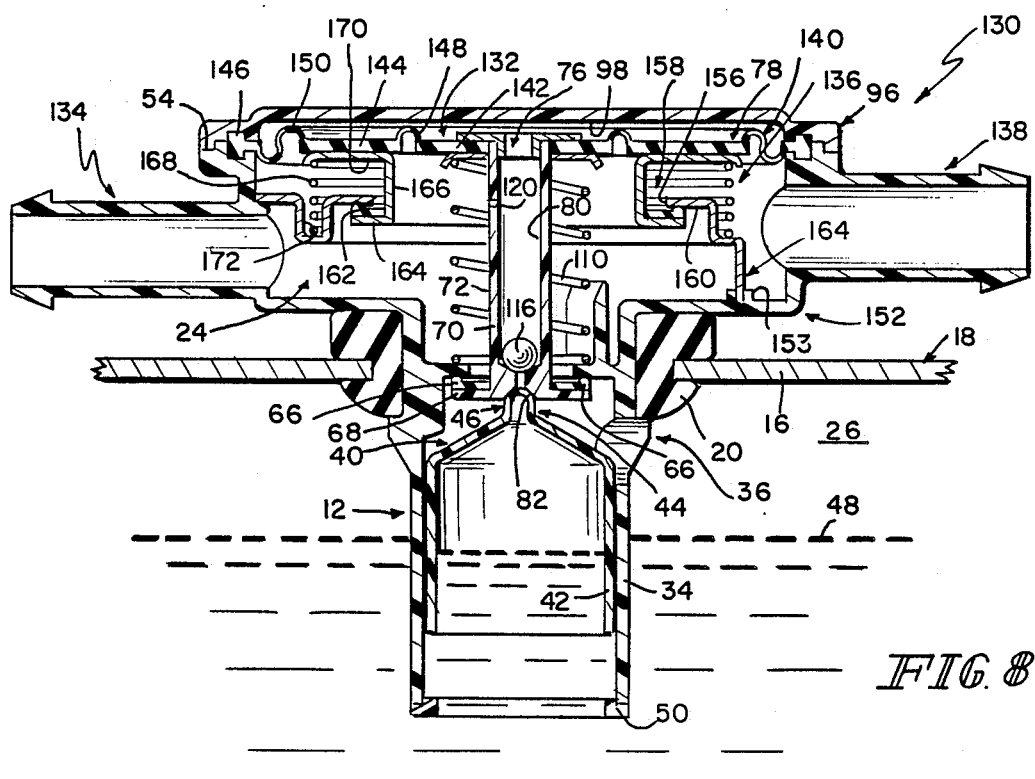
FIG. 8 is a view of the valve assembly shown in FIG. 5 showing bleeding of pressure in the venting control chamber upon cessation of the supply of pressurized fuel vapor from the fuel tank to the venting control chamber.

Primary and auxiliary venting valves 66 and 162, respectively, are both shown in their flow-delivery positions in FIG. 7. In this case, the pressure in the venting control chamber 78 has risen above a predetermined threshold level that is greater than the level at which the primary valve 66 is actuated. Movement of float valve 40 to block communication of pressurized fuel vapor from the vapor space 26 to the venting control chamber 78 is illustrated in FIG. 8. This stage of operation is similar in function to the stage illustrated in FIG. 3. In addition, it will be understood that actuator stem 70 and valve 66 function as a vacuum-relief valve in the embodiment of FIGS. 5-8 in the same manner as explained in connection with the embodiment of FIGS. 1-4 and illustrated in FIG. 4.

Although the invention has been described in detail with reference to certain preferred embodiments, variations and modifications exist within the scope and spirit of the invention as described and defined in the following claims.

WHAT IS CLAIMED IS:

1. An apparatus for controlling discharge of fuel vapors from a fuel tank during refueling, the apparatus comprising
   means for conducting fuel vapor between the fuel tank and a fuel vapor treatment site situated outside of the fuel tank,
   means for selectively blocking flow of fuel vapor through the conducting means, the blocking means being operable between a flow-blocking position and a flow-delivery position,
   means for yieldably biasing the blocking means toward its flow-blocking position, and
   means defining a venting control chamber in communication with the blocking means for receiving and using fuel vapor pressure from the fuel tank having a magnitude in excess of a predetermined threshold level to exert an opening force on the blocking means in opposition to the biasing means so that the blocking means is moved to its flow-delivery position, thereby permitting discharge of pressurized fuel vapor in the tank to said fuel vapor treatment site through the conducting means, the blocking means being formed to include means for communicating fuel vapor from the fuel tank to the venting control chamber.

2. The apparatus of claim 1, wherein the venting control chamber is situated outside of the fuel tank and the blocking means extends through the conducting means into the fuel tank.

3. The apparatus of claim 2, wherein the conducting means includes a partition formed to include a venting aperture interconnecting the fuel tank and fuel vapor treatment site in fluid communication, the blocking means includes an elongated stem having a valve member affixed at one end and a support member affixed at the other end, and the biasing means is situated to act between the partition and the support member normally to urge the valve member against the partition closing the venting aperture 4. The apparatus of claim 3, wherein the valve member is formed to include a central aperture communicating with the fuel tank, the support member is formed to include a central aperture, and the stem is hollow to provide a pressure transmission passage interconnecting the central apertures of the valve member and the support member to define the communicating means.

5. The apparatus of claim 2, wherein the conducting means includes a fluid-conducting tube extending into the fuel tank and partition means for dividing the fluid-conducting tube into an inner chamber communicating with the fuel tank and an outer chamber communicating with the fuel vapor treatment site, the partition means includes a valve seat having an inner edge defining a venting aperture interconnecting the inner and outer chambers, and the blocking means includes a valve member formed to include means for sealingly engaging the valve seat to block flow of fluid through the venting aperture between the fuel tank and the fuel vapor treatment site and a central aperture coupled to the communicating means so that pressurized fuel vapor is communicable from the fuel tank to the venting control chamber via the communicating means while the blocking means is in its flow-blocking position.

6. The apparatus of claim 5, wherein the valve member is situated within the inner chamber, the blocking means further includes a support member situated within the outer chamber, and the biasing means is positioned in the outer chamber to act between the partition means and the support member.

7. The apparatus of claim 1, wherein the blocking means and the biasing means cooperate to define vacuum relief means for unblocking the conducting means in response to suction caused by subatmospheric pressure in the field tank to draw ambient air into the fuel tank via the fuel vapor treatment site.

8. An apparatus for controlling discharge of fuel vapors from a fuel tank during refueling, the apparatus comprising means for conducting fuel vapor between the fuel tank and a fuel vapor treatment site situated outside of the fuel tank, means for selectively blocking flow of fuel vapor through the conducting means, the blocking means being operable between a flow-blocking position and a flow-delivery position, means for yieldably biasing the blocking means toward its flow-blocking position, means defining a venting control chamber in communication with the blocking means for receiving and using fuel vapor pressure from the fuel tank having a magnitude in excess of a predetermined threshold level to exert an opening force on the blocking means in opposition to the biasing means so that the blocking means is moved to its flow-delivery position, thereby permitting discharge of pressurized fuel vapor in the tank to said fuel vapor treatment site through the conducting means, means for communicating fuel vapor from the conducting means to at least one of the atmosphere and another fuel vapor treatment site, valve means for selectively blocking flow of fuel vapor through the communicating means, the valve means being operable between a flow-blocking position and flow-delivery positions, and auxiliary biasing means for yieldably biasing the valve means toward its flow-blocking position, the using means including control means communicating with the venting control chamber for using fuel vapor pressure in the fuel tank having a magnitude in excess of a greater second predetermined threshold level to exert an opening force on the valve means so that the valve means is moved in opposition to the auxiliary biasing means to its flow-delivery position, thereby permitting discharge of pressurized fuel vapor in the tank to another fuel vapor treatment site through the conducting means and the communicating means.

9. An apparatus for controlling discharge of fuel vapors from a fuel tank during refueling, the apparatus comprising means for conducting fuel vapor between the fuel tank and a fuel vapor treatment site situated outside of the fuel tank, means for selectively blocking flow of fuel vapor through the conducting means, the blocking means being operable between a flow-blocking position and a flow-delivery position, the blocking means including an actuator stem extending through the conducting means and means coupled to the actuator stem for sealingly engaging the conducting means upon movement of the blocking means to its flow-blocking position, means for yieldably biasing the blocking mean toward its flow-blocking position, and means for using fuel vapor in the fuel tank having a pressure in excess of a predetermined threshold level to exert an opening force on the blocking means in opposition to the biasing means so that the blocking means is moved to its flow-delivery position, thereby permitting discharge of pressurized fuel vapor in the tank to said fuel vapor treatment site through the conducting means, the using means including a cover member and barrier member sealingly coupled to the cover member for movement relative to the cover member to define a venting control chamber therebetween, the actuator stem being coupled to the movable barrier member and to the engaging means to move in unison therewith, and the movable barrier member and the actuator stem operating to define means for selectively establishing fluid communication between the fuel tank and the venting control chamber so that fuel tank pressure in excess of the predetermined threshold level communicated to the venting control chamber acts upon the barrier member to apply a movement-inducing force in opposition to force provided by the biasing means sufficient to move the engaging means away from sealing engagement with the conducting means to establish the flow-delivery position of the blocking means.

10. The apparatus of claim 9, further comprising means in the fuel tank for disabling the establishing means upon accumulation of fuel in the fuel tank in excess of a predetermined volume, and wherein the using means further includes means for bleeding pressure from the venting control chamber at a predetermined rate causing the magnitude of pressure in the venting control chamber progressively to decrease upon actuation of the disabling means to reduce the magnitude of the movement-inducing force applied to the movable barrier member without substantially lowering the magnitude of the movement-inducing force developed by pressure in the venting control chamber prior to actuation of the disabling means so that the force applied to the blocking means by the biasing means is sufficient to move the engaging means towards sealing engagement with the conducting means upon actuation of the disabling means, thereby establishing the flow-blocking position of the blocking means.

11. The apparatus of claim 9, wherein the fuel tank is formed to include an outlet aperture, the conducting means is mounted in the outlet aperture and includes a partition member and means for establishing a seal between the fuel tank and the partition member, the partition member includes an interior wall exposed to fuel vapor in the fuel tank and formed to include a venting aperture, the engaging means is movable between a closing position sealingly engaging the interior wall of the partition member and opening positions away from the interior wall of the partition member, the biasing means acts between the partition member and the movable barrier member, and the engaging means, actuator stem, movable barrier member, and biasing means cooperate to define vacuum relief means for unblocking the venting aperture in response to suction caused by subatmospheric pressure in the fuel tank to draw ambient air into the fuel tank through the fuel vapor treatment site.

12. The apparatus of claim 9, wherein the movable barrier member includes a first-stage actuation member coupled to the actuator stem, a second-stage actuation member, first seal means for coupling the first- and second-stage actuation members together to permit relative movement therebetween, and second seal means for coupling the cover member and the second-stage actuation member together to permit relative movement therebetween, and second seal means for coupling the cover member and the second-stage actuation member together to permit relative movement therebetween, the biasing means acts against the first-stage actuation member, and further comprising means for communicating fuel vapor from the conducting means to at least one of the atmosphere and another fuel vapor treatment site, valve means for selectively blocking flow through the communicating means, the valve means being operable between a flow-blocking position and flow-delivery positions, and auxiliary biasing means acting against the second-stage actuation member for yieldably biasing the valve means toward its flow-blocking position, the second-stage actuation member and the auxiliary biasing means cooperating to define control means for using fuel vapor pressure in the fuel tank having a magnitude in excess of a greater second predetermined threshold level to exert an opening force on the valve means so that the valve means is moved in opposition to the auxiliary biasing means to its flow-delivery position, thereby permitting discharge of pressurized fuel vapor in the fuel tank to another fuel vapor treatment site through the conducting means and the communicating means.

13. The apparatus of claim 12, wherein the first-stage actuation member is a ring having an inner edge defining a central aperture coupled to the establishing means and an outer edge, the second-stage actuation member having a diameter greater than the diameter of the first-stage actuation member and having an inner edge defining a central aperture sized to receive the first-stage actuation member therein and an outer edge, the first seal means is an annular, flexible diaphgram interconnecting the outer edge of the first-stage actuation member and the inner edge of the second-stage actuation member, and the second seal means is an annular, flexible diaphragm interconnecting the cover member and the outer edge of the second-stage actuation member.

14. An apparatus for controlling discharge of fuel vapors from a fuel tank during refueling, the apparatus comprising
    means for conducting fuel between the fuel tank and a fuel vapor treatment site situated outside of the fuel tank,
    means for selectively blocking flow of fuel vapor through the conducting means, the blocking means being operable between a flow-blocking position and a flow-delivery position,
    means for yieldably biasing the blocking means towards its flow-blocking position, and
    means for using fuel vapor in the fuel tank having a pressure in excess of a predetermined threshold level to exert an opening force on the blocking means so that the blocking means is moved in opposition to the biasing means to its flow-delivery position, thereby permitting discharge of pressurized fuel vapor in the tank to said fuel vapor treatment site through the conducting means, the using means including a cover coupled to the conducting means, a primary actuation member, and means for coupling the primary actuation member to the cover to permit relative movement between the primary actuation member and the cover, the cover, primary actuation member, and coupling means cooperating to define venting control chamber means for containing pressurized fuel vapor in a predetermined region permitting pressurized fuel vapor to exert said opening force on the primary actuation member, the primary actuation member being coupled to the blocking means so that the blocking means moves towards its flow-delivery position in response to exertion of said opening force on the primary actuation member.

15. The apparatus of claim 14, wherein the primary actuation member is formed to include means extending through the conducting means for communicating pressurized fuel vapor from the fuel tank to the predetermined region and the venting control chamber means is formed to include means for bleeding pressurized fuel vapor extant in the predetermined region at a predetermined rate to the conducting means and further comprising means for preventing communication of pressurized fuel vapor from the fuel tank to the predetermined region via the communicating means upon accumulation of at least a predetermined volume of fuel in the fuel tank.

16. The apparatus of claim 14, wherein the blocking means is formed to include a central aperture, the primary actuation member includes an actuation pad presented toward the cover to communicate with pressurized fuel vapor in the predetermined region, the actuation pad being formed to include a central aperture, and a hollow stem interconnecting the central apertures of the actuation pad and the blocking means to define a pressure transmission passage extending between the fuel tank and the predetermined region so that pressurized fuel vapor in the fuel tank is communicable from the fuel tank to the predetermined region.

17. The apparatus of claim 16, wherein the using means further includes head valve means in the pressure transmission passage for blocking communication of pressurized fuel vapor in the fuel tank to the predetermined region until the pressure of fuel vapor in the fuel tank is in excess of the predetermined threshold level.

18. The apparatus of claim 16, further comprising float means buoyantly supportable by fuel in the fuel tank for closing the central aperture in the blocking means upon accumulation of at least a predetermined volume of fuel in the fuel tank to block transmission of pressurized fuel vapor from the fuel tank to the predetermined region via the pressure transmission passage and wherein the hollow stem is formed to include aperture means interconnecting the pressure transmission passage and a portion of the conducting means outside of the fuel tank to bleed pressure extant in the predetermined region and the pressure transmission passage at a predetermined rate at least upon closure of the central aperture in the blocking means to enable the biasing means to urge the blocking means toward its flow-delivery blocking position.

19. The apparatus of claim 14, wherein the coupling means includes an auxiliary actuation member movable relative to each of the primary actuation member and the cover, and further comprising means for communicating fuel vapor from the conducting means to at least one of the atmosphere and another fuel vapor treatment site, valve means coupled to the auxiliary actuation member for selectively blocking flow of fuel vapor through the communicating means, the valve means being operable between flow-blocking position and flow-delivery positions, and auxiliary biasing means for yieldably biasing the valve means toward a flow-blocking position, and the valve means is moved in opposition to the auxiliary biasing means to its flow-delivery position in response to movement of the auxiliary actuation member induced by pressure in the predetermined region in excess of another predetermined threshold level, which pressure acts upon the auxiliary actuation member to apply a movement-inducing force in opposition to the force provided by the auxiliary biasing means, thereby permitting discharge of pressurized fuel vapor in the fuel tank to yet another fuel vapor treatment site through the conducting means and the communicating means.

20. An apparatus for controlling discharge of fuel vapors from a fuel tank during refueling, the apparatus comprising
   means for conducting fuel vapor between the fuel tank and a fuel vapor treatment site situated outside of the fuel tank,
   means for selectively blocking flow of fuel vapor through the conducting means, the blocking means being operable between a flow-blocking position and a flow-delivery position,
   means for yieldably biasing the blocking means toward its flow-blocking position, and
   means for using fuel vapor in the fuel tank having a pressure in excess of a predetermined threshold level to exert an opening force on the blocking means in opposition to the biasing means so that the blocking means is moved to its flow-delivery position, thereby permitting discharge of pressurized fuel vapor in the tank to said fuel vapor treatment site through the conducting means, the conducting means being formed to including a valve seat having an inner edge defining a venting aperture, the using means including first and second walls sealably coupled together and movable relative to one another to define an expandable and contractible venting control chamber therebetween, and the blocking means including a venting valve member that is movable between a flow-blocking position engaging the valve seat to close the venting aperture and a flow-delivery position away from the valve seat opening the venting aperture, and a stem interconnecting the venting valve member and the second wall, the venting valve member being formed to include a central aperture communicating with the fuel tank, the second wall being formed to include a central aperture providing an opening into the venting control chamber, the biasing means acting between the conducting means and the second wall normally to urge the second wall toward the first wall to contract the volume control chamber to urge the venting valve member to its flow-blocking position, the stem being formed to include means interconnecting the central apertures of the second wall and the venting valve member for communicating pressurized fuel vapor from the fuel tank to the venting control chamber so that the second wall moves relative to the first wall in opposition to the biasing means to expand the volume of the venting control chamber and urge the venting valve member toward its flow-delivery position.

21. The apparatus of claim 20, further comprising means in the communicating means for blocking communication of pressurized fuel vapor in the fuel tank to the venting control chamber until the pressure of fuel vapor in the fuel tank is in excess of a predetermined threshold level.

22. The apparatus of claim 20, further comprising means in the fuel tank for blocking introduction of pressurized fuel vapor in the fuel tank into the communicating means to prevent communication of pressurized fuel vapor to the venting control chamber in response to accumulation of fuel in the fuel tank in excess of a predetermined volume to shut off supply of pressurized fuel vapor to the venting control chamber through the communicating means and means for bleeding pressurized fuel vapor from the venting control chamber at a predetermined rate to permit the biasing means to move the second wall relative to the first wall, thereby contracting the volume of the venting control chamber and urging the venting valve member toward its flow-blocking position.

23. An apparatus for controlling discharge of fuel vapors from a fuel tank having an outlet during refueling, the apparatus comprising
   means for dividing the outlet into separate first and second fuel vapor flow ports so that pressurized fuel vapor in the fuel tank is exhaustible therefrom through said ports,
   vapor delivery means for conducting fuel vapor from the first port to at least one fuel vapor treatment site, and
   control means for using pressurized fuel vapor discharged through the fuel tank outlet via the second fuel vapor flow port to regulate the flow of fuel vapors through the first fuel vapor flow port so that fuel vapor in the fuel tank can be selectively discharged through the fuel tank outlet via the first fuel vapor flow port and recovered at the at least one fuel vapor treatment site during refueling, the control means including a valve member movable between a first position blocking flow of fuel vapor through the first fuel vapor flow port and a second position permitting flow of fuel vapor through the first fuel vapor flow port, the valve member being formed to include a central aperture defining the second fuel vapor flow port, means for yieldably biasing the valve member toward its first position, venting control chamber means for containing pressurized fuel vapor in a predetermined region, the venting control chamber means including a movable actuation pad having an interior surface defining a portion of the boundary of the predetermined region, means for interconnecting the movable actuation pad and the valve member so that the valve member moves in unison with the actuation pad, and passageway means for conducting pressurized fuel vapor from the central aperture to the predetermined region to permit pressure in excess of a predetermined threshold level communicated to the predetermined region by the passageway means to exert sufficient force on the actuation pad to overcome the force of the biasing means so that the valve member is moved toward its second position.

24. The apparatus of claim 23, wherein the interconnecting means is formed to include the passageway means.

25. The apparatus of claim 23, wherein the control means further includes head valve means in the passageway means for blocking communication of pressurized fuel vapor in the fuel tank to the predetermined region until the pressure of fuel vapor in the fuel tank is in excess of a predetermined threshold level.

26. The apparatus of claim 23, further comprising means for closing the second fuel vapor flow port upon accumulation of fuel in the fuel tank in excess of a predetermined volume to shut off the supply of pressurized fuel vapor to the predetermined region and wherein the control means further includes means for bleeding pressurized fuel vapor from the predetermined region at a predetermined rate so that the magnitude of pressure of the predetermined region is progressively lowered to permit the biasing means to return the valve member to its first position upon lowering of pressure extant in the predetermined region below a minimum threshold level.

27. A system for handling fuel vapors from a vehicle fuel system, the vehicle fuel system including a fuel tank and means for processing fuel vapor, the system comprising
means for conducting fuel vapor between the fuel tank and the processing means,
means for selectively blocking flow of fuel vapor through the conducting means, the blocking means being actuable between a flow-blocking condition and flow-delivery condition, the blocking means being formed to include means for communicating pressurized fuel from the fuel tank to a predetermined region, and
venting control chamber means for containing fuel vapor in the predetermined region communicating with the blocking means and permitting fuel vapor to exert a opening-inducing force on the blocking means causing the blocking means to change to its flow-delivery condition, thereby unblocking discharge of fuel vapor in the fuel tank to the processing means via the conducting means.

28. The system of claim 27, further comprising valve means for selectively blocking the communicating means in response to accumulation of fuel in the fuel tank in excess of a predetermined volume and means for bleeding pressure in the predetermined region at a predetermined rate to the conducting means to permit the magnitude of the opening-inducing force exerted on the blocking means to be reduced upon actuation of the valve means.

29. The system of claim 28, further comprising means for yieldably biasing the blocking means toward its flow-delivery condition as long as the magnitude of pressure in the predetermined region remains less than a predetermined maximum pressure.

30. A system for handling fuel vapors from a vehicle fuel system, the vehicle fuel system including a fuel tank and means for processing fuel vapor, the system comprising
means for conducting fuel vapor between the fuel tank and the processing means,
means for selectively blocking flow of fuel vapor through the conducting means, the blocking means including a valve member situated in the fuel tank and an actuator pad situated outside the fuel tank, and means for interconnecting the valve member and the actuator pad for movement in unison, the valve member being operable between a flow-blocking position, and flow-delivery positions,
means for yieldably biasing the actuator pad to a position corresponding with the flow-blocking position of the blocking means,
means for communicating a closing pressure generated by fuel vapor in the fuel tank actuator pad to change the valve member to its flow-blocking position, and
means for selectively venting the communicating means to the atmosphere to dissipate any closing pressure therein to permit the biasing means to urge the valve member from its flow-delivery position to its flow-blocking position in response to lowering of the closing pressure to a magnitude less than a predetermined level.

* * * * *